United States Patent [19]
Woodward

[11] 3,746,386
[45] July 17, 1973

[54] TENT FOR REAR-DOORED VEHICLE

[75] Inventor: Frederick W. Woodward, Dearborn Heights, Mich.

[73] Assignees: Donald Thornber; Bernice B. Thornber

[22] Filed: July 17, 1972

[21] Appl. No.: 272,587

[52] U.S. Cl............. 296/23 MC, 135/4 R, 135/1 R
[51] Int. Cl.............................................. B60p 3/34
[58] Field of Search................. 135/1 A, 1 R, 4 R; 296/23 C, 23 MC, 23 R, 26

[56] References Cited
UNITED STATES PATENTS

| | | | |
|---|---|---|---|
| 3,479,079 | 11/1969 | Coursault............................ | 296/26 |
| 3,410,598 | 11/1968 | Davis et al. ...................... | 296/23 R |
| 2,246,813 | 6/1941 | Preston .............................. | 296/26 |
| 2,353,820 | 7/1944 | Eddins ............................... | 296/23 R |
| 3,186,419 | 6/1965 | McCarroll........................... | 135/1 A |
| 2,483,478 | 10/1949 | Smelker.............................. | 135/1 A |
| 3,082,033 | 3/1963 | Bosher................................ | 296/26 |

*Primary Examiner*—Jordan Franklin
*Assistant Examiner*—Conrad L. Berman
*Attorney*—Gerald E. McGlynn, Jr., Allan K. Krass et al.

[57] ABSTRACT

A tent for use with automobiles having a rear door which opens upwardly about a horizontal hinge attached to its top edge. The tent has a prism shape including a pair of substantially parallel triangular ends joined on two sides by quadrangles with the third side being open. One side fits over the top of the open door so that the other side hangs down from the top open end of the door in a substantially horizontal plane with its lower edge joined to the rear of the vehicle adjacent its bumper. The free edges of the ends seal against the rear quarter panels of the car. The ends are secured to the vehicle by elastic straps having hooks on their free edges which clip under convenient points on the car body.

2 Claims, 5 Drawing Figures

PATENTED JUL 17 1973 3,746,386
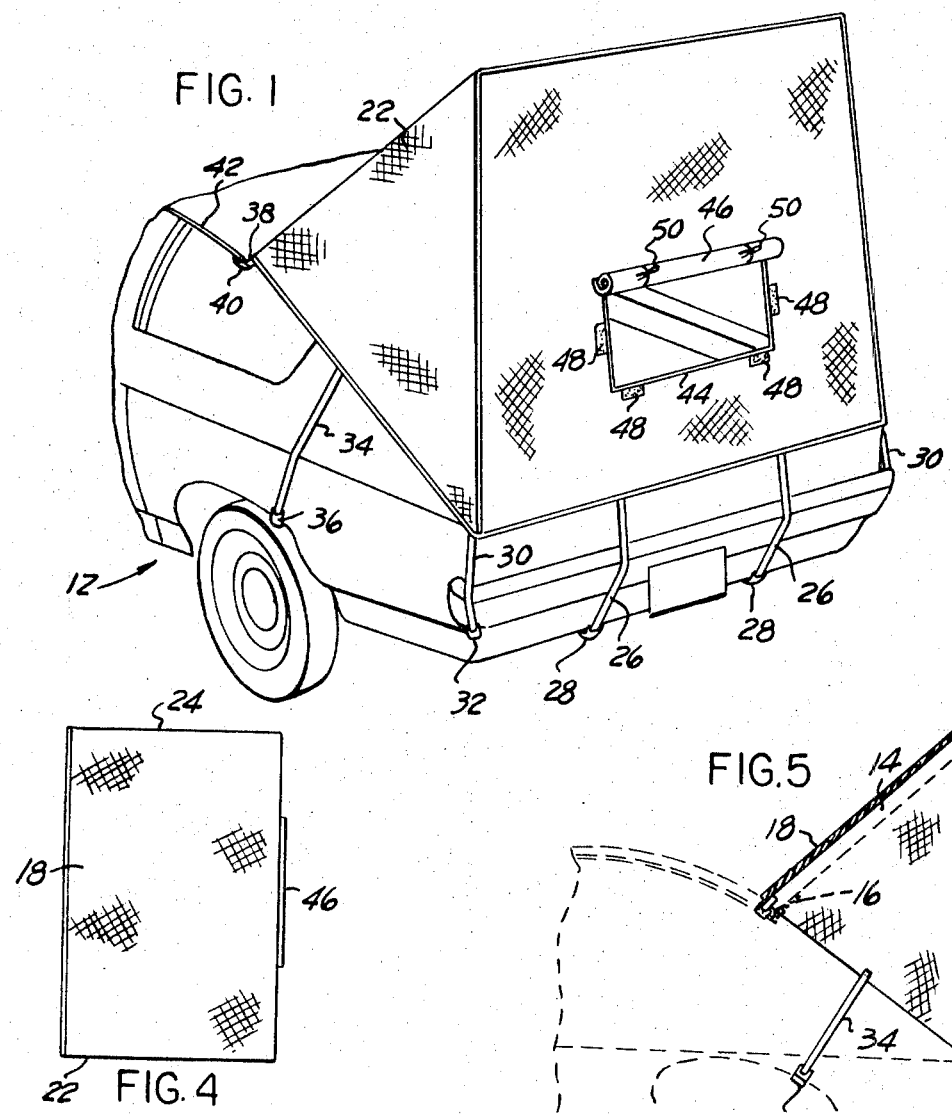
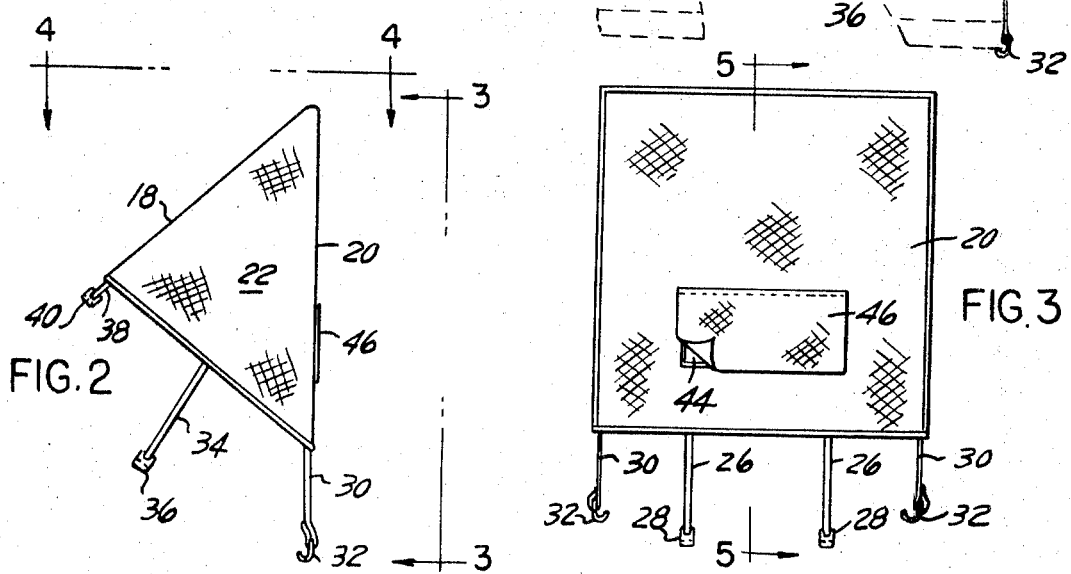

TENT FOR REAR-DOORED VEHICLE

FIELD OF THE INVENTION

This invention relates to tents adapted to be used with vehicles to form compartments suitable for sleeping and camping purposes.

BACKGROUND OF THE INVENTION

In recent years a wide variety of devices have been developed for use in connection with automobiles, trucks and other vehicles to form enclosed compartments in association with the vehicle suitable for use as sleeping or camping quarters.

In the last few years a number of small cars have been marketed which have a pair of side doors and a third rear door. The rear door is hinged for movement about a horizontal line on its upper end and when closed generally is inclined downward and to the rear. When opened, it projects upwardly and to the rear so as to allow access to the rear compartment of the vehicle.

The present invention contemplates a tent attachment which may be used with vehicles having rear doors of this type to form an enlarged compartment in the rear of the vehicle which is useful for sleeping or camping purposes or simply to provide an enlarged storage area.

SUMMARY OF THE PRESENT INVENTION

The present invention broadly takes the form of a four-sided tent having two triangular, parallel disposed end sections joined on two of their mutual edges by a pair of sides. The third side of the triangular prism thus formed by the tent is left open. The tent may be formed of woven or non-woven fabric or plastic or any other suitable material. One of the sides has a configuration similar to the rear door of the vehicle with which it is to be used and is adapted to be arrayed over the outer side of that rear door when the door is in an open position so that the other side of the tent projects in a downward generally vertical attitude.

The lower edge of this generally vertical side is disposed adjacent to the rear bumper of the vehicle. The two triangular sides have their free edges extending along the upper window and/or quarter panel of the vehicle between the hinged edge of the door and the rear bumper. The tent thus encloses a compartment which extends outwardly from the rear of the vehicle. Windows or doors may be formed in either end or the sides of the tent to provide access to the compartment, light and ventilation.

In the preferred embodiment of the invention the free edges of the tent are retained in abutment with the vehicle by means of hooks which are fastened to the edges of the tent by elastic straps. These hooks fasten under appropriate points of the trim and underbody of the vehicle in order to securely retain the tent in place. By means of the hooks the tent may be quickly and easily attached to and removed from the vehicle.

The tent of the present invention thus forms a simple low-cost compartment which may be used with little effort to provide sleeping, living or storage space in a vehicle having a third door.

Other objectives, advantages and applications of the invention will be made apparent by the following detailed description of a preferred embodiment of the invention. The description makes reference to the accompanying drawings in which:

FIG. 1 is a perspective view of the rear section of a vehicle equipped with a tent formed in accordance with the preferred embodiment of the invention, taken from the left rear side;

FIG. 2 is a side view of the tent in extended form;

FIG. 3 is a rear view of the tent in extended form showing one edge of a flap formed over the window lifted for purposes of illustration taken along line 3—3 of FIG. 2;

FIG. 4 is a top view of the tent taken along line 4—4 of FIG. 2; and

FIG. 5 is a cross sectional view through the rear section of a vehicle equipped with the tent taken along line 5—5 of FIG. 3, with the vehicle illustrated in phantom.

Referring to the drawings, the tent constituting the preferred embodiment to the general invention, generally indicated at 10 in FIG. 1, is intended for use in connection with an automobile, generally indicated at 12, of the type having a rear door 14 (FIG. 5) which swings about a hinge 16 extending horizontally across the rear of the body and disposed at the upper edge of the door opening. Conventional means (not shown) are provided for retaining the door in its full open position, as illustrated in FIG. 5, wherein it projects rearwardly and upwardly with respect to the body of the vehicle so that its free edge is disposed approximately over the rear bumper of the vehicle. In its closed position, the door generally slants rearwardly and downwardly to close the opening in the vehicle.

The main body of the tent is preferably formed of canvas duck material although other suitable sheet materials may be employed. Alternate embodiments of the tent might also be formed using rigid sheets with suitable means for folding them into a closed position.

One of the sides 18 of the tent has the same shape as the door of the vehicle. This may be generally rectangular or trapezoidal. While a rectangular section is illustrated in the drawings, it should be recognized that the shape of the section 18 is dependent upon the shape of the door 14. The section 18 is adapted to be arrayed over the outer side of the door 14 while it is in an open position. A second, rear side of the tent 20 is generally rectangular in configuration and is attached to the side 18 at their upper edges. The side 20 is of sufficient height so that its lower edge extends to the bottom of the door opening.

The tent is completed by a pair of sides 22 and 24 which each have two of their edges joined to edges of the sides 18 and 20 respectively.

It should be recognized that the exact configuration of the tent is a function of the shape of the vehicle door 14 and the other dimensions of the vehicle. As has been noted, the door 14 may be trapezoidal in which case the ends 22 and 24 would not extend exactly parallel. The door might also have curvilinear edges.

The tent is secured to the vehicle by means of a plurality of hooks attached to elastic straps retained to the free edge of the vehicle. A pair of straps 26 having hooks 28 on their free ends are attached to points along the bottom of the rear side 22 and are adapted to engage the edge of the under-frame of the vehicle. Another pair of straps 30 are affixed at the lower rear corners of the tent and their hooks 32 are adapted to engage the bumper. A pair of side straps 34 are affixed to the center of the free edges of the ends 22 and 24 and their hooks 36 engage the edges of the rear wheel wells. A pair of shorter straps 38 are affixed to the lower front corners of the tent and the hooks 40 affixed to their free ends engage under the rain gutters 42 of the car.

For purposes of light and ventilation, a rectangular window opening 44 is formed in the center of the rear side 20. A canvas flap 46 with slightly larger dimensions than the window has its upper edge attached above the opening so that it extends downward to cover the opening. The flap may be retained in its closed position by means of fasteners 48 of the hook and eye type which are affixed to the canvas around the sides and lower edge of the opening and which engage complementary members (not shown) on the flap 46. Alternately the flap 46 may be retained in its rolled up position by means of tie strings 50.

Having thus described my invention, I claim:

1. A frameless tent for a passenger type vehicle having a rear door supported in an opening, the vehicle body providing access to the passenger compartment of the vehicle which door is hinged about a horizontal axis at the upper edge of the opening so that when in a closed position its free edges project downward and rearwardly and seal against the edges of the opening and when in an opened position they project upward and rearwardly, said tent comprising: a pair of spaced end panel portions having a triangle shape formed by first, second and third edges, said second edge forming a base of the triangle and being generally vertically disposed and being substantially longer than the other two edges, said first edge extending downward and forward from the top of said second edge along the edge of the open door, said third edge extending upward and forward from the bottom of said second edge generally along the edge of the door opening, said first and third edges adapted to be connected at the axis of the door and forming an apex of the triangle shape, said second edge of each end panel portion connected together by a first generally vertically disposed quadrangular panel effectively enclosing the space formed within the combined vehicle and tent structure and acting to limit the spacing between the end panels to the width of the vehicle, the first edge of each end panel part connected together by a second generally quadrangular panel and adapted to entirely cover the opened door and to be supported thereby, and fastener means for retaining the third edges of the end panel portions in contact with the vehicle as well as the lower portion of the first quadrangular panel in contact with the vehicle whereby the tent is securely held against the vehicle during movement thereof solely by said fasteners and the door of the vehicle.

2. The frameless tent of claim 1 wherein the end panel portions and the quadrangular panels are flexible so that the entire tent structure may be folded for storage.

* * * * *

UNITED STATES PATENT OFFICE
CERTIFICATE OF CORRECTION

Patent No. 3,746,386           Dated July 17, 1973

Inventor(s) Frederick W. Woodward

It is certified that error appears in the above-identified patent and that said Letters Patent are hereby corrected as shown below:

Column 3, line 17 after "opening" delete "," and insert --in--.

Signed and sealed this 8th day of January 1974.

(SEAL)
Attest:

EDWARD M. FLETCHER, JR.　　　RENE D. TEGTMEYER
Attesting Officer　　　　　　Acting Commissioner of Patents